United States Patent
Shiramshetty et al.

(10) Patent No.: US 12,169,498 B1
(45) Date of Patent: Dec. 17, 2024

(54) CREATING AND SEARCHING TIERED METRIC TIME SERIES OBJECT STORAGE

(71) Applicant: SPLUNK Inc., San Francisco, CA (US)

(72) Inventors: Uday Sagar Shiramshetty, Fremont, CA (US); Mitchell Grayer Eisenstat, Menlo Park, CA (US); Chowie Chunyan Lin, San Jose, CA (US)

(73) Assignee: SPLUNK Inc., San Francisco, CA (US)

( * ) Notice: Subject to any disclaimer, the term of this patent is extended or adjusted under 35 U.S.C. 154(b) by 45 days.

(21) Appl. No.: 18/160,250

(22) Filed: Jan. 26, 2023

(51) Int. Cl.
*G06F 16/00* (2019.01)
*G06F 16/2458* (2019.01)
*G06F 16/248* (2019.01)
*G06F 16/28* (2019.01)

(52) U.S. Cl.
CPC ........ *G06F 16/2477* (2019.01); *G06F 16/248* (2019.01); *G06F 16/285* (2019.01)

(58) Field of Classification Search
None
See application file for complete search history.

(56) References Cited

U.S. PATENT DOCUMENTS

| | | |
|---|---|---|
| 7,937,344 B2 | 5/2011 | Baum et al. |
| 8,112,425 B2 | 2/2012 | Baum et al. |
| 8,751,529 B2 | 6/2014 | Zhang et al. |
| 8,788,525 B2 | 7/2014 | Neels et al. |
| 9,215,240 B2 | 12/2015 | Merza et al. |
| 9,286,413 B1 | 3/2016 | Coates et al. |
| 10,127,258 B2 | 11/2018 | Lamas et al. |
| 2014/0330818 A1* | 11/2014 | Raina ............... G06Q 50/01 707/723 |
| 2018/0121566 A1* | 5/2018 | Filippi ............. G06T 11/206 |
| 2019/0098106 A1 | 3/2019 | Mungel et al. |

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

*Primary Examiner* — Thu Nguyet T Le
(74) *Attorney, Agent, or Firm* — Kilpatrick Townsend & Stockton LLP

(57) ABSTRACT

Metric time series (MTS) data objects stored within in-memory storage are marked as inactive in response to determining that no MTS data has been received for the MTS objects within a first predetermined time period. In response to determining that an MTS object has been inactive for longer than a second predetermined time period, the MTS data object is migrated from in-memory storage to on-disk storage. Queries directed to MTS objects are first run against MTS object data stored within in-memory storage, and then against MTS object data stored within on-disk storage. In this way, an amount of in-memory storage needed to store MTS objects may be minimized, while optimizing search performance.

20 Claims, 9 Drawing Sheets

CREATING AND SEARCHING TIERED METRIC TIME SERIES OBJECT STORAGE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures.

DETAILED DESCRIPTION

Figure 1:
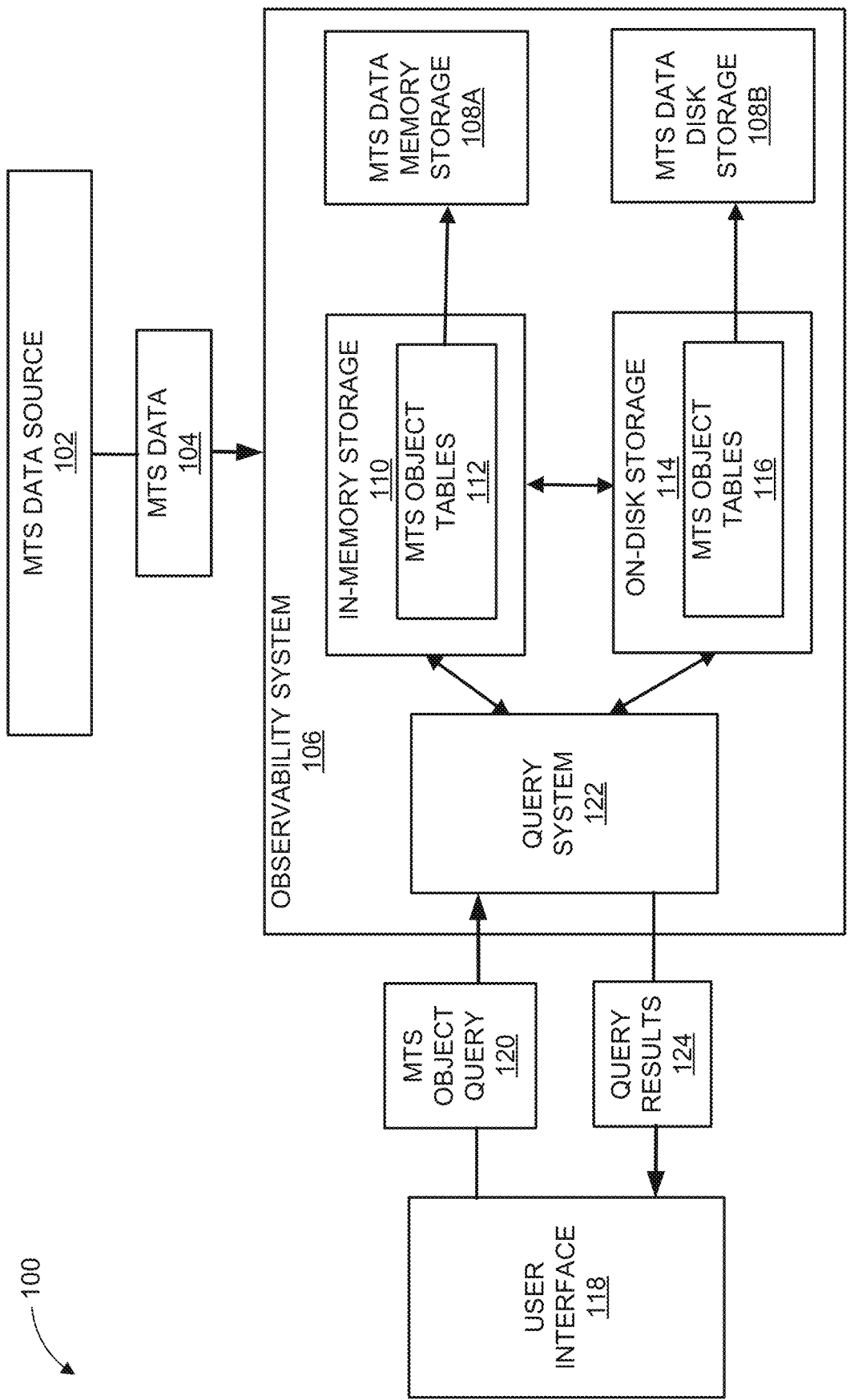
FIG. 1 is a block diagram of an environment for creating and searching tiered metric time series object storage, according to at least one implementation.

An observability platform offers a unified environment to monitor infrastructure, applications, and supporting services in real-time, in a single pane of glass. The platform integrates with common data sources to get data from on-premise and cloud infrastructure, applications and services, and user interfaces into the observability platform.

In certain implementations, when data is sent from each layer of a full-stack environment to the observability platform, the observability platform transforms raw metrics, traces, and logs into actionable insights in the form of dashboards, visualizations, alerts, and more. The features of the observability platform enable users to quickly and intelligently respond to outages and identify root causes, while also giving users the data-driven guidance needed to optimize performance and productivity.

Additionally, in certain implementations the observability platform receives data from a user's environment using supported integrations to common data sources. The observability platform offers insights into infrastructure as well as the ability to perform powerful, capable analytics infrastructure and resources across hybrid and multi-cloud environments. Infrastructure monitoring offers support for a broad range of integrations for collecting all kinds of data, from system metrics for infrastructure components to custom data from applications.

Further, in certain implementations the observability platform also collects traces and spans to monitor distributed applications. A trace is a collection of actions, or spans, that occur to complete a transaction. The observability platform collects and analyzes every span and trace from each of the services connected to the observability platform to give users full-fidelity access to all of their application data.

Further still, in certain implementations the observability platform may provide insights about the performance and health of a front-end user experience of one or more applications. The observability platform collects performance metrics, web vitals, errors, and other forms of data to enable users to detect and troubleshoot problems in their application, measure the health of their application, and assess the performance of their user experience.

Also, in certain implementations the observability platform also synthetically measures performance of web-based properties. It offers features that provide insights that enable users to optimize uptime and performance of APIs, service endpoints, and end user experiences and prevent web performance issues.

In addition, in certain implementations the observability platform troubleshoots applications and infrastructure behavior using high-context logs. Users can perform codeless queries on logs to detect the source of problems in their systems. Users can also extract fields from logs to set up log processing rules and transform their data as it arrives.

Furthermore, in certain implementations the observability platform includes incident response software that aligns log management, monitoring, chat tools, and more for a single pane of glass into system health. The observability platform automates delivery of alerts to get the right alert, to the right user, at the right time.

The observability platform performs the retrieval and analysis of metric time series (MTS) data (where this data may include data produced by one or more monitored applications). Within the observability platform, MTS objects may be created that point to corresponding MTS data, where the MTS objects may include metadata describing aspects of the MTS data (such as the source of the MTS data, one or more characteristics of the MTS data, etc.)

MTS objects may be created within the observability system in response to the creation of an entity such as a virtual machine. To optimize search performance of MTS object data, these MTS objects are stored in in-memory storage within the observability platform, which provides optimal performance but is costly to maintain. When entity creation happens frequently, large amounts of MTS objects are created and stored within costly in-memory storage within the observability platform.

To address this issue, MTS objects stored within in-memory storage are marked as inactive in response to determining that no MTS data has been received for the MTS objects within a first predetermined time period. In response to determining that an MTS object has been inactive for longer than a second predetermined time period, the MTS data object is migrated from in-memory storage to on-disk storage. Queries directed to MTS objects are first run against MTS object data stored within in-memory storage, and then against MTS object data stored within on-disk storage. In this way, an amount of in-memory storage needed to store MTS objects may be minimized, while optimizing search performance.

FIG. 1 illustrates an environment 100 for creating and searching tiered metric time series object storage. As shown, metric time series (MTS) data 104 is sent from an MTS data source 102 to an observability system 106. In one implementation, the MTS data source 102 may include systems associated with a client of the observability system 106 that provide one or more services by performing one or more actions. In another implementation, the MTS data source 102 may be one of a plurality of distributed computing devices. For example, the MTS data source 102 may be included within a distributed system such as a cloud computing system, a multi-tenant architecture, etc.

Additionally, in one implementation, the MTS data 104 may include time series data produced by the service being implemented by the MTS data source 102. For example, the MTS data 104 may include one or more spans that describe traffic associated with a website being hosted by the MTS data source 102. A span may represent an individual unit of work done by the service device. In another implementation, the MTS data 104 may be sent by a monitoring agent installed within the MTS data source 102. In yet another implementation, the observability system 106 may include a system that creates, analyzes, and manages time series metrics.

Figure 4:
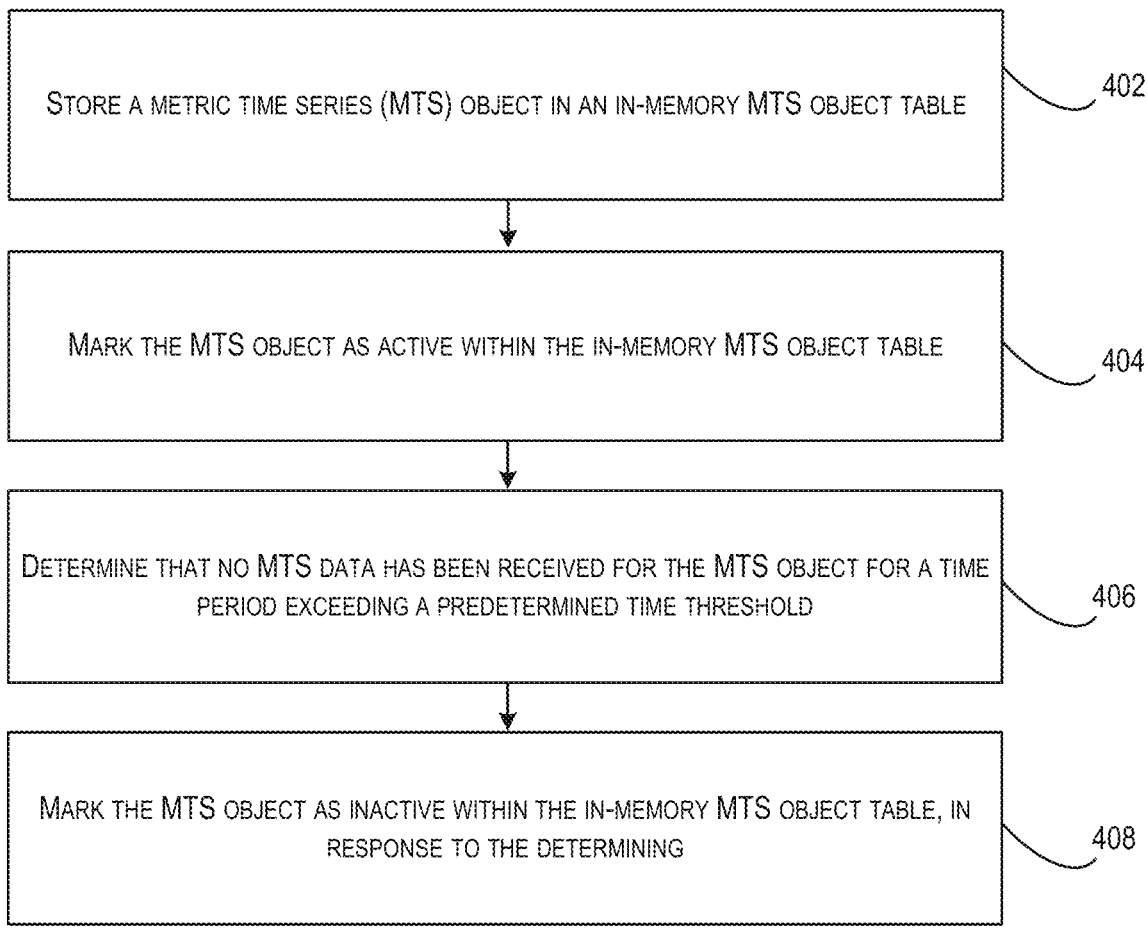
FIG. 4 illustrates an example method for marking a metric time series object as inactive, according to at least one implementation.

Further, MTS data storage 108A-B may store the received MTS data 104. MTS objects may be created for the received MTS data 104 and may be initially stored in MTS object tables 112 within in-memory storage 110 of the observability system 106. The MTS objects within the MTS object tables 112 may point to corresponding MTS data stored within the MTS data storage 108A-B. Although an instance of MTS data memory storage 108A is shown located outside of in-memory storage 110, and an instance of MTS data disk storage 108B is shown located outside of on-disk storage 114, in various embodiments, the instance of MTS data memory storage 108A may be located within in-memory storage 110, and the instance of MTS data disk storage 108B may be located within on-disk storage 114. In response to determining that MTS data has not been received for a particular instance of an MTS data object, the MTS data object may first be marked as inactive within the MTS object tables 112 of the in-memory storage 110. One example of how this is performed is illustrated in FIG. 4.

Figure 5:
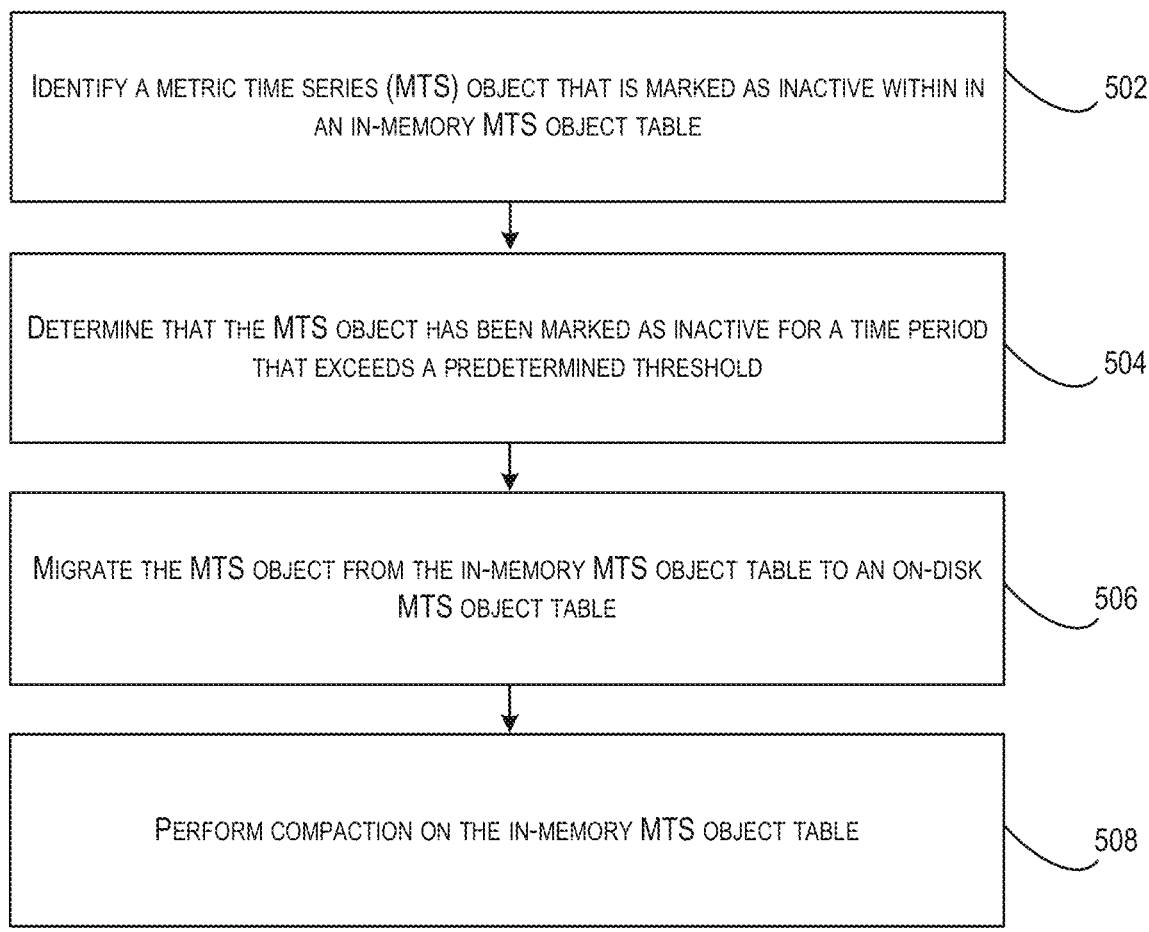
FIG. 5 illustrates an example method for migrating inactive metric time series data objects from an in-memory table to an on-disk table, according to at least one implementation.
Figure 6:
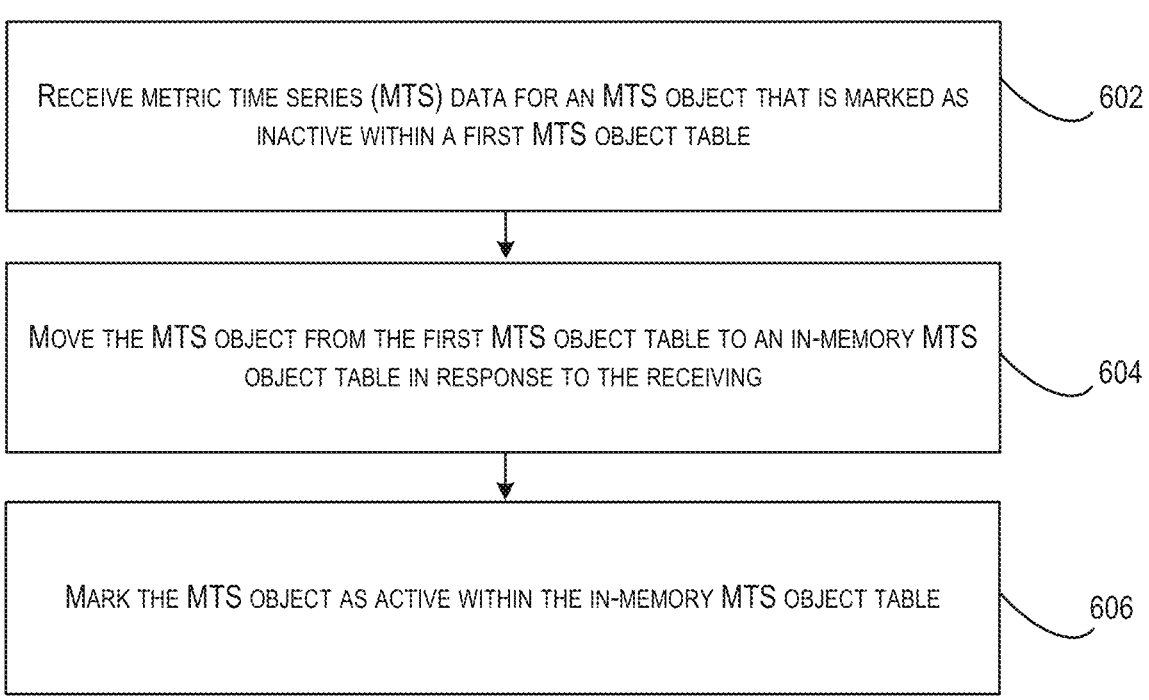
FIG. 6 illustrates an example method for conditionally migrating active metric time series data objects from an on-disk table to an in-memory table, according to at least one implementation.

Further still, in response to determining that an MTS data object within the in-memory storage 110 has been marked as inactive for a time period longer than a threshold time, the MTS data object may be migrated from the MTS object tables 112 of the in-memory storage 110 to MTS object tables 116 of on-disk storage 114. One example of how this is performed is illustrated in FIG. 5. It should be noted that, although a single instance of MTS object tables 116 is shown, the on-disk storage 114 may be subdivided into separate files, where each of the separate files has its own MTS object tables 116. If, while stored in on-disk storage, MTS data is again received for the inactive MTS data object, the MTS data object may be marked as active and migrated back from the MTS object tables 116 of on-disk storage 114 to the MTS object tables 112 of the in-memory storage 110. One example of how this is performed is illustrated in FIG. 6.

Figure 7:
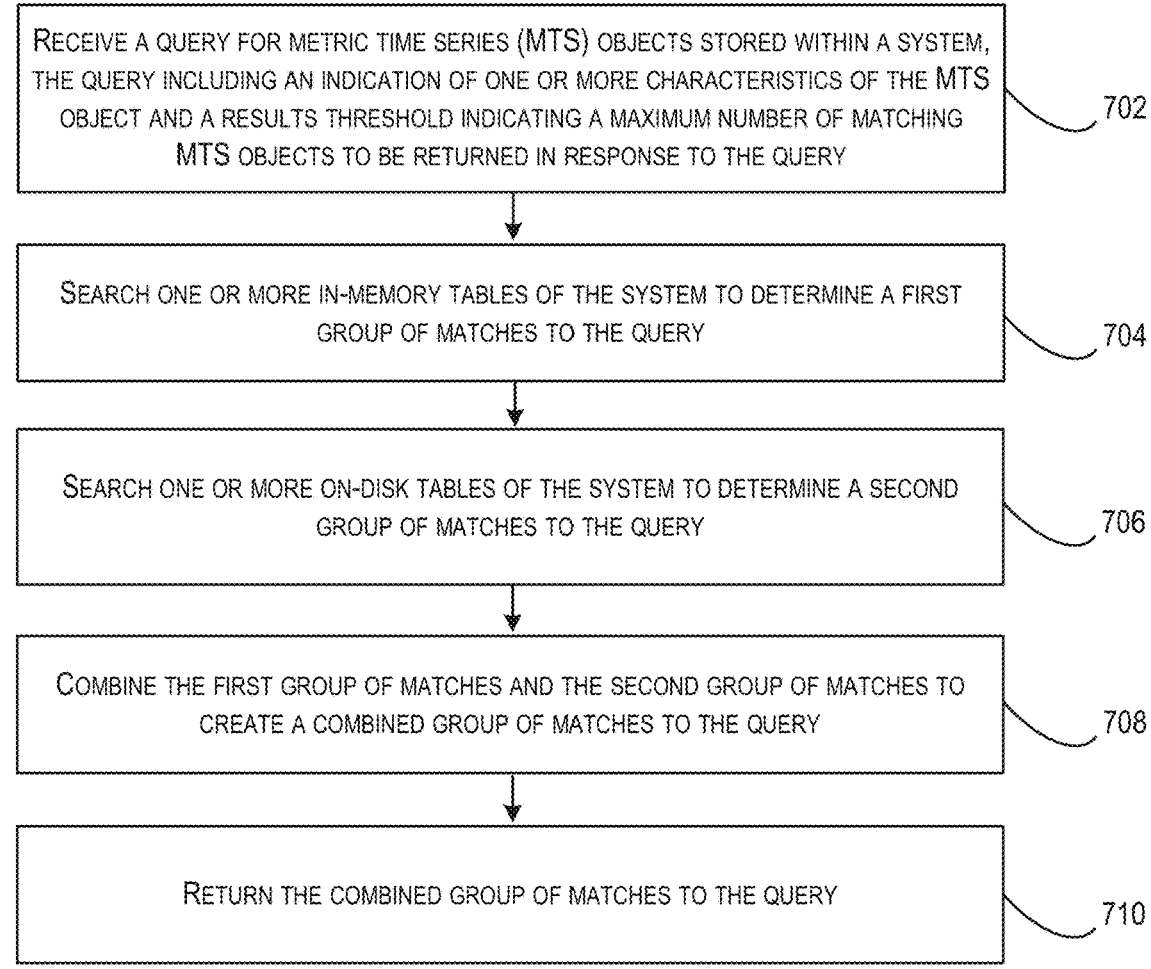
FIG. 7 illustrates an example method for implementing a query for metric time series objects within tiered metric time series object storage, according to at least one implementation.
Figure 8:
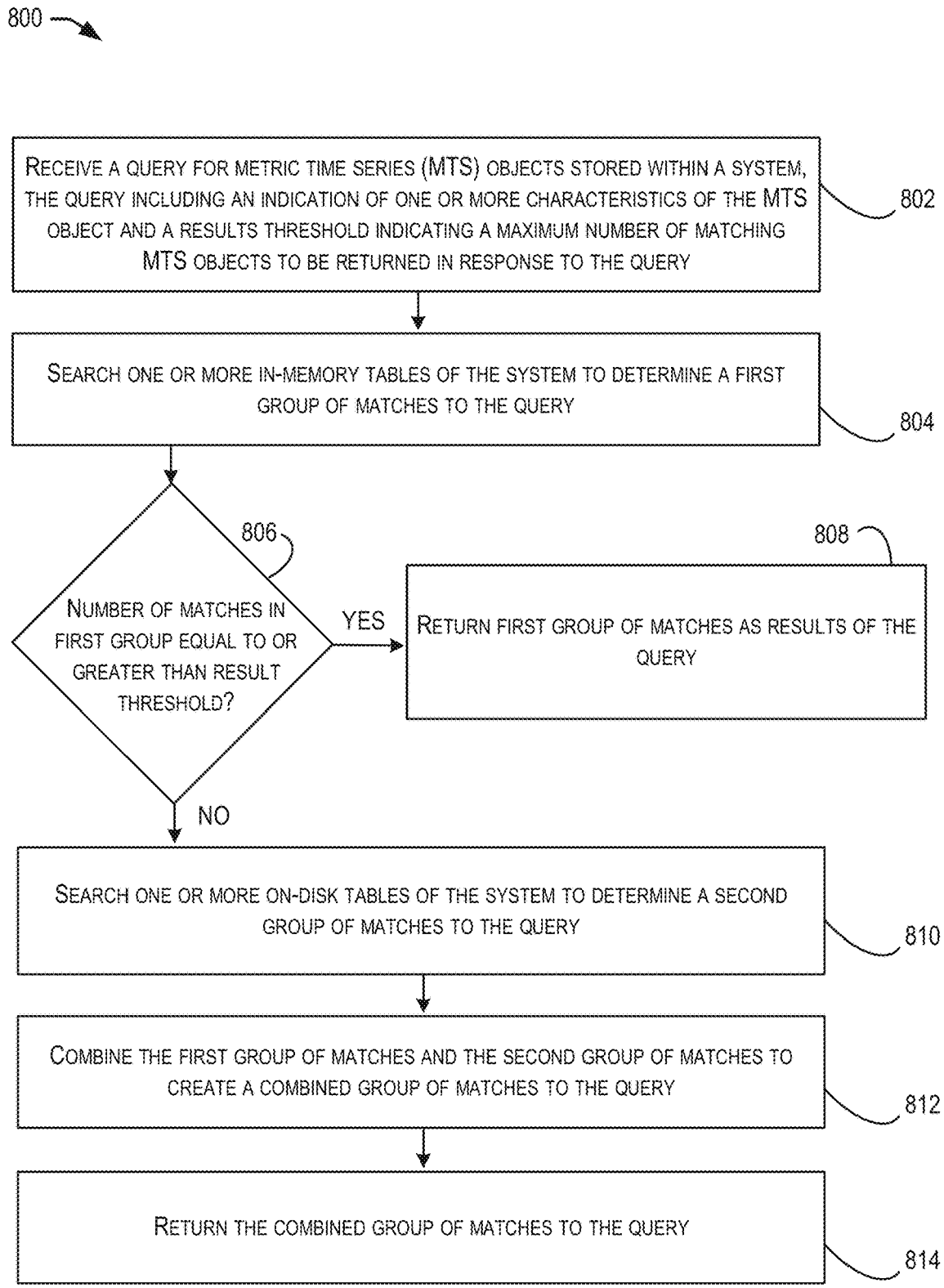
FIG. 8 illustrates an example method for implementing a query for metric time series objects within tiered metric time series object storage, where the query includes a result threshold, according to at least one implementation.

Also, an MTS object query 120 may be received by a query system 122 from a user interface 118. The query system 122 may search both the MTS object tables 112 of the in-memory storage 110 and the MTS object tables 116 of on-disk storage 114 when implementing a search based on the received MTS object query 120 and may respond by providing query results 124 to the user interface 118. Various examples of how these queries are structured, and how searches are performed, are shown in FIGS. 7-8.

In some environments, a user of an observability system 106 may install and configure, on computing devices owned and operated by the user, one or more software applications that implement some or all of the components of the observability system 106. For example, with reference to FIG. 1, a user may install a software application on the MTS data source 102 owned by the user and configure each server to operate as one or more components of the observability system 106. This arrangement generally may be referred to as an "on-premises" solution. That is, the observability system 106 can be installed and can operate on computing devices directly controlled by the user of the observability system 106. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of observability system 106 operate.

In certain implementations, one or more of the components of the observability system 106 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide an observability system 106 by managing computing resources configured to implement various aspects of the system (e.g., the query system 122, the MTS data storage 108A-B, the in-memory storage 110, the on-disk storage 114, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the observability system 106 execute can be shared by multiple customers or tenants as part of the shared computing resource environment. In addition, when implemented in a shared computing resource environment as a cloud-based service, various components of the observability system 106 can be implemented using containerization or operating-system-level virtualization, or other virtualization techniques. For example, one or more components of the query system 122, the MTS data storage 108A-B, etc. can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the observability system 106 in a shared computing resource environment can provide a number of benefits. In some cases, implementing the observability system 106 in a shared computing resource environment can make it easier to install, maintain, and update the components of the observability system 106. For example, rather than accessing designated hardware at a particular location to install or provide a component of the observability system 106, a component can be remotely instantiated or updated as desired. Similarly, implementing the observability system 106 in a shared computing resource environment or as a cloud-based service can make it easier to meet dynamic demand. For example, if the observability system 106 experiences significant load at indexing or search, additional compute resources can be deployed to process the additional data or queries. In an "on-premises" environment, this type of flexibility and scalability may not be possible or feasible.

In addition, by implementing the observability system 106 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the observability system 106 and/or to other systems unrelated to the observability system 106.

As mentioned, in an on-premises environment, data from one instance of an observability system 106 is logically and physically separated from the data of another instance of an observability system 106 by virtue of each instance having its own designated hardware. As such, data from different customers of the observability system 106 is logically and physically separated from each other. In a shared computing resource environment, components of an observability system 106 can be configured to process the data from one customer or tenant or from multiple customers or tenants. Even in cases where a separate component of an observability system 106 is used for each customer, the underlying hardware on which the components of the observability system 106 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the observability system 106 can maintain logical separation between tenant data. For example, the observability system 106 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customers A's hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the observability system 106 can maintain the mutual exclusivity and/or independence between tenant data even as the tenant data is being processed, stored, and searched by the same underlying hardware. In certain cases, to maintain the mutual exclusivity and/or independence between the data of different tenants, the observability system 106 can use tenant identifiers to uniquely identify data associated with different tenants.

In a shared computing resource environment, some components of the observability system 106 can be instantiated and designated for individual tenants and other components can be shared by multiple tenants. In certain implementations, the query system 122, the MTS data storage 108A-B, the in-memory storage 110, the on-disk storage 114, etc. can be instantiated for each tenant or shared by multiple tenants. In some such implementations where components are shared by multiple tenants, the components can maintain separate directories for the different tenants to ensure their mutual exclusivity and/or independence from each other. Similarly, in some such implementations, the observability system 106 can use different hosting computing systems or different isolated execution environments to process the data from the different tenants as part of the query system 122, the MTS data storage 108A-B, the in-memory storage 110, the on-disk storage 114, etc.

In some implementations, individual components of the query system 122, the MTS data storage 108A-B, the in-memory storage 110, the on-disk storage 114, etc. may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In some cases, by sharing more components with different tenants, the functioning of the observability system 106 can be improved. For example, by sharing components across tenants, the observability system 106 can improve resource utilization, thereby reducing an amount of resources allocated as a whole.

Figure 2:
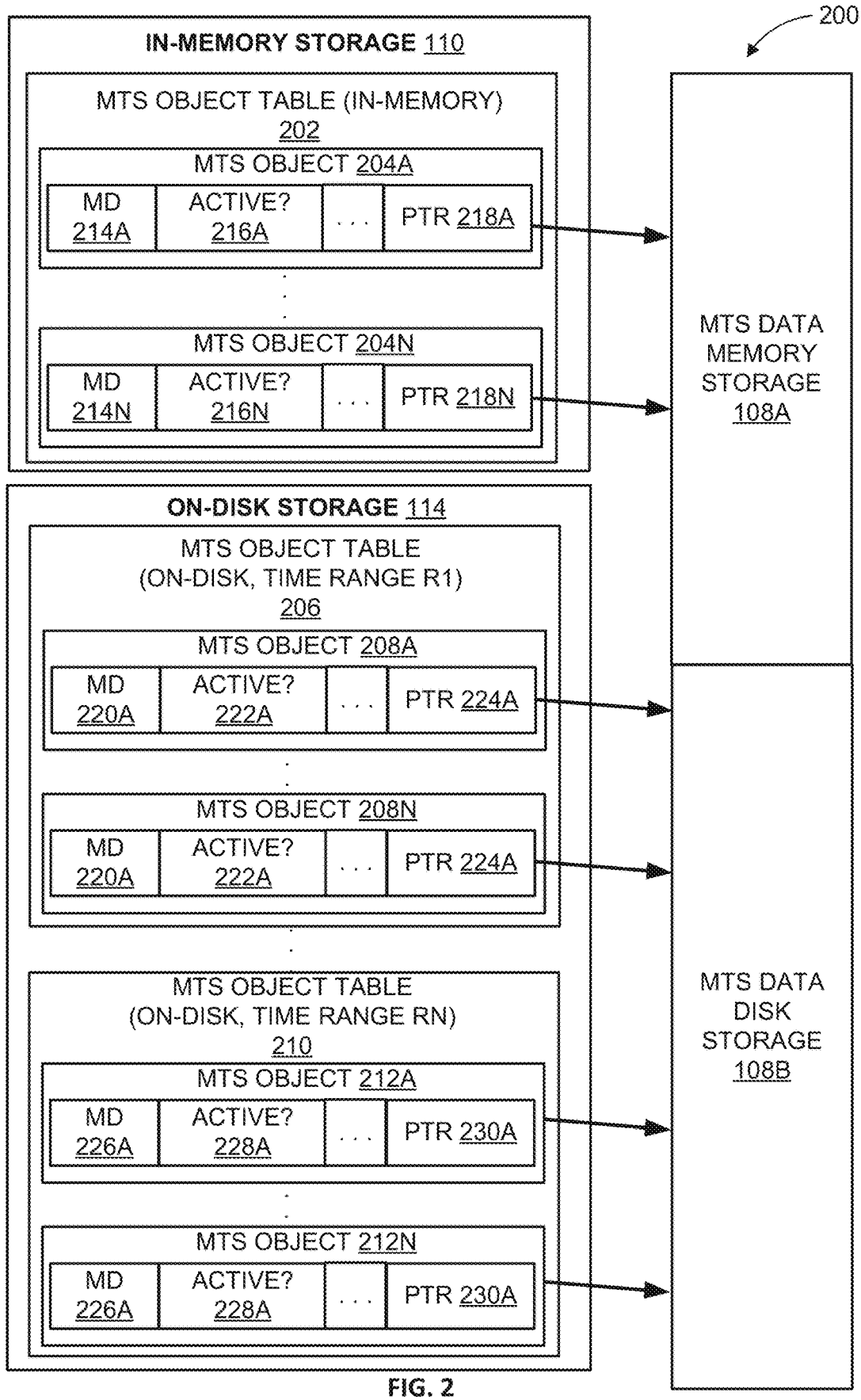
FIG. 2 is a block diagram of additional details of tiered metric time series object storage, according to at least one implementation.

FIG. 2 illustrates additional details 200 of tiered metric time series object storage. As shown, a first group of MTS objects 204A-204N are stored in an in-memory MTS object table 202 within in-memory storage 110. Each of these MTS objects 204A-204N includes data including, but not limited to, metadata 214A-N, an active/inactive flag 216A-N, and a pointer 218A-N. For example, the metadata 214A-N may describe a source of corresponding MTS data for the MTS object 204A-204N, one or more characteristics of the corresponding MTS data, etc. The active/inactive flag 216A-N may indicate whether each of the MTS objects 204A-204N is currently active or inactive (this flag may always be false for the MTS objects 204A-204N stored in the in-memory MTS object table 202. The pointer 218A-N may point to MTS data stored within the MTS data memory storage 108A that corresponds to the MTS objects 204A-204N. The MTS objects 204A-204N may also include metadata indicating a last active time for the MTS object.

Likewise, a second group of MTS objects 208A-208N are stored in an on-disk MTS object table 206 within on-disk storage 114, where such on-disk MTS object table 206 was last active at time range R1 (and MTS objects 208A-N were added to the on-disk MTS object table 206 at a starting time T for time range R1). Each of these MTS objects 208A-208N includes data including, but not limited to, metadata 220A-N, an active/inactive flag 222A-N, and a pointer 224A-N. This data is similar in scope to the data described above with respect to the first group of MTS objects 204A-204N. The pointer 224A-N may point to MTS data stored within the MTS data disk storage 108B that corresponds to the MTS objects 208A-208N. The MTS objects 208A-208N may also include metadata indicating a last active time for the MTS object. For example, MTS objects 208A-208N may have a last active timestamp set for them when they are added to the MTS object table 206 and may always be inactive when stored in the on-disk storage 114. In general, inactive MTS objects may be placed within on-disk storage 114 in an MTS object table having a timestamp range (between a minimum last active timestamp and a maximum last active timestamp) that includes the last active timestamp for the inactive MTS object.

A third group of MTS objects 212A-212N are stored in an on-disk MTS object table 210 within on-disk storage 114, where such MTS objects 212A-N were last active at time T+N, where N is a numerical value indicating the time between the creation of the on-disk MTS object table 206 and the on-disk MTS object table 210. Each of these MTS objects 212A-212N includes data including, but not limited to, metadata 226A-N, an active/inactive flag 228A-N, and a pointer 230A-N. This data is similar in scope to the data described above with respect to the first group of MTS objects 204A-204N. The pointer 230A-N may point to MTS data stored within the MTS data disk storage 108B that corresponds to the MTS objects 212A-212N.

Various examples of how data is migrated within the depicted tiered metric time series object storage, as well as how queries are resolved within the depicted tiered metric time series object storage, these queries are structured, and how searches are performed, are shown in FIGS. 4-8.

Figure 3:
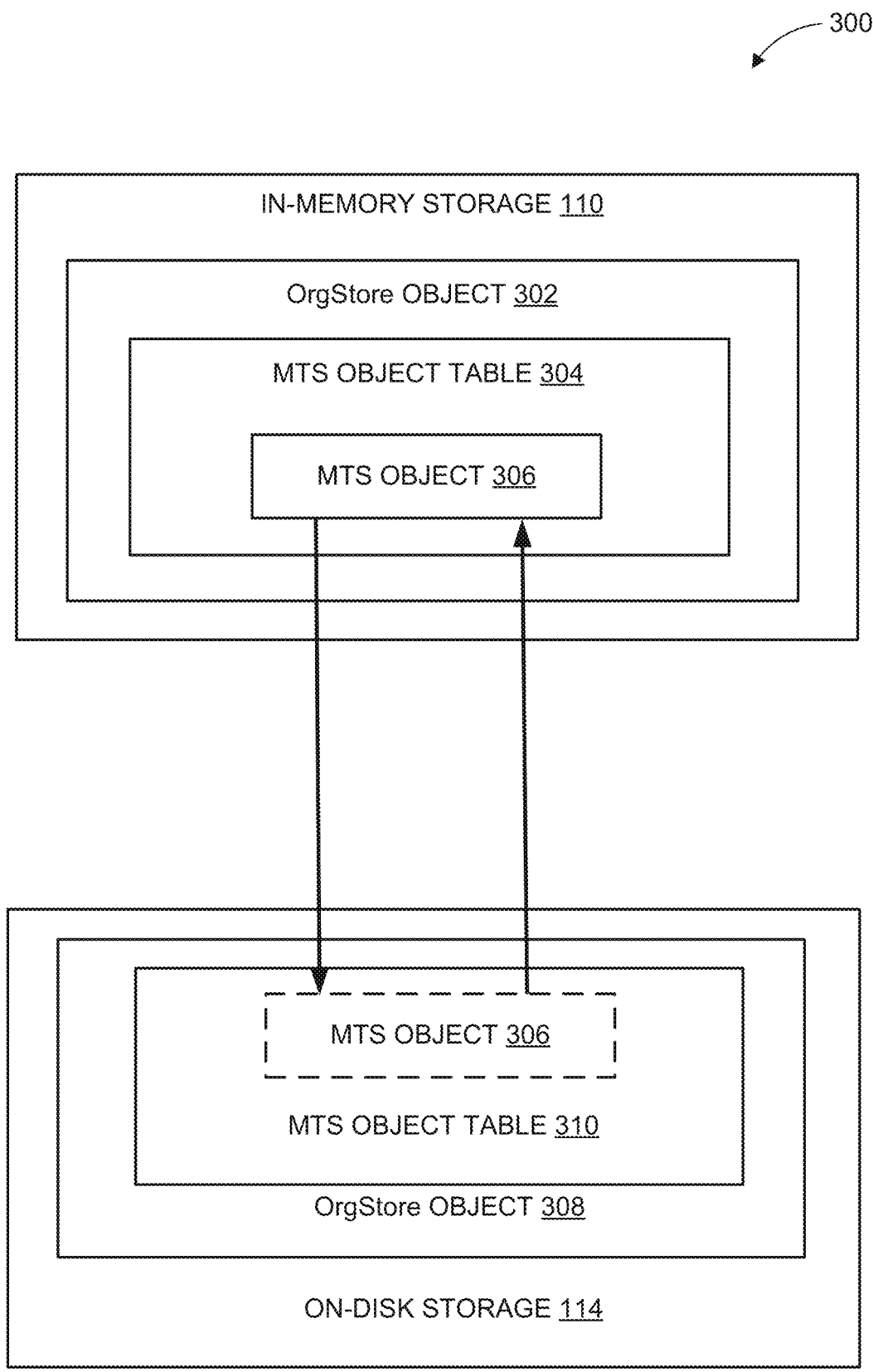
FIG. 3 is a block diagram of metric time series object migration between in-memory storage and on-disk storage, according to at least one implementation.

FIG. 3 illustrates metric time series object migration between in-memory storage 110 and on-disk storage 114. As shown an MTS object 306 is stored within an MTS object table 304 that is in turn stored within an OrgStore object 302 within in-memory storage 110. In response to one or more criteria, the MTS object 306 may be migrated from the MTS object table 304 to an MTS object table 310 stored within an OrgStore object 308 within on-disk storage 114. In response to one or more additional criteria, the MTS object 306 may be migrated back from the MTS object table 310 to the MTS object table 304. Criteria for performing this migration is shown in FIGS. 4-6. Also, in various embodiments where an instance of MTS data memory storage (such as the instance of MTS data memory storage 108A in FIG. 1) is located within in-memory storage 110, the OrgStore object 302 may encapsulate both the MTS object table 304 and the instance of MTS data memory storage. Likewise, in various embodiments where an instance of MTS data disk storage (such as the instance of MTS data disk storage 108B in FIG. 1) is located within on-disk storage 114, the OrgStore object 308 may encapsulate both the MTS object table 310 and the instance of MTS data disk storage.

FIG. 4 illustrates an example method 400 for marking a metric time series object as inactive, according to at least one implementation. The method 400 may be performed by one or more components of FIGS. 1, 2, 3, and 9. A computer-readable storage medium comprising computer-readable instructions that, upon execution by one or more processors of a computing device, cause the computing device to perform the method 400. The method 400 may be performed in any suitable order. It should be appreciated that the method 400 may include a greater number or a lesser number of steps than that depicted in FIG. 4.

The method 400 may begin at 402, where a metric time series (MTS) object is stored in an in-memory MTS object table. In one implementation, a collection of MTS data may be initiated within a system (such as the observability system 106 of FIG. 1). For example, the MTS data may include one or more data points that each have an associated time stamp. In another example, the MTS data may be generated at a data source (such as a client computing device, storage device, networking device, etc.).

Additionally, in one example, the MTS data may be generated by an agent installed on the device. In another example, the agent may monitor one or more components of the data source (such as a processor, a memory, a communications network component, etc.). In yet another example, the agent may monitor one or more software components (e.g., a virtual machine, a container, etc.). In still another example, the agent may monitor one or more environmental components (e.g., one or more sensors, etc.).

Further, in one implementation, the MTS data may include performance data (such as a CPU utilization, memory usage, network bandwidth, etc.). In another implementation, the MTS data may be retrieved by the system and stored within the system (e.g., within MTS data storage 108A-B of FIG. 1, etc.). In yet another implementation, the MTS object may be created in association with the MTS data. In still another implementation, the MTS object may include metadata associated with the MTS data.

Further still, in one implementation, the MTS object may include metadata describing the source of the MTS data, one or more characteristics of the MTS data, etc. For example, the MTS object may include one or more key/value pairs that describe the component for which the MTS data is being collected. In another implementation, the MTS object may include multiple dimensions. For example, each dimension may include one or more properties (e.g., host, business unit, region, etc.).

Also, in one implementation, example MTS object metadata may include a customer ID associated with the MTS data, a metric being monitored by the MTS data (such as CPU utilization, network utilization, etc.). In another implementation, example dimensions may include a host name, a region ID, etc. In yet another implementation, the MTS object may include a pointer to a location within the system where the corresponding MTS data is stored. In still another implementation, a hash may be calculated utilizing the MTS object metadata. For example, this hash may be used to access the corresponding MTS data within the system.

In addition, in one implementation, an in-memory MTS object table may include a table storing one or more MTS objects that is located within shared memory (such as random-access memory (RAM)) of the system. In another implementation, an orgstore object may be created within the shared memory of the system and an MTS object table may be stored within the orgstore object. For example, the MTS object may be stored within the MTS object table.

Furthermore, at 404, the MTS object is marked as active within the in-memory MTS object table. In one implementation, the MTS object may be automatically marked as active when it is stored within the in-memory MTS object table. In another implementation, the MTS object may include a field (such as a flag field) that has a value (such as a binary value) indicating whether the MTS object is active or inactive. In yet another implementation, the MTS object may be marked as active to indicate that MTS data associated with the MTS object is currently being received by the system.

Further still, at 406, it is determined that no MTS data has been received for the MTS object for a time period exceeding a predetermined threshold. In one implementation, the MTS object may include timestamp data indicating a last time that MTS data was received in association with the MTS object. In another implementation, the timestamp may be compared to a current time to determine a time period since MTS data was last received in association with the MTS object. In yet another implementation, this time period may be compared to a predetermined threshold time value (e.g., twenty-five hours, etc.).

Also, as shown at 408, the MTS object is marked as inactive within the in-memory MTS object table, in response to the determining. In one implementation, in response to determining that the time period exceeds the threshold time value, the field indicating whether the MTS object is active or inactive may be changed to indicate that the MTS object is currently inactive. In another implementation, the MTS object may be marked as inactive (e.g., by adjusting a flag within the MTS object indicating activity/inactivity) to indicate that MTS data associated with the MTS object is not currently being received by the system. For example, the flag may be changed from a value indicating active to a value indicating inactive.

Additionally, in one implementation, additional metadata (such as a timestamp) may be added to the MTS object indicating a time at which the MTS object was marked as inactive.

FIG. 5 illustrates an example method 500 for migrating inactive metric time series data objects from an in-memory table to an on-disk table, according to at least one implementation. The method 500 may be performed by one or more components of FIGS. 1, 2, 3, and 9. A computer-readable storage medium comprising computer-readable instructions that, upon execution by one or more processors of a computing device, cause the computing device to perform the method 500. The method 500 may be performed in any suitable order. It should be appreciated that the method 500 may include a greater number or a lesser number of steps than that depicted in FIG. 5.

The method 500 may begin at 502, where an MTS object that is marked as inactive is identified within an in-memory MTS object table. In one implementation, the in-memory MTS object table may be parsed. In another implementation, a flag within each MTS object that indicates activity/inactivity may be identified. In yet another implementation, it may be determined that an MTS object is inactive b y identifying a flag within the MTS object that indicates that the MTS object is inactive.

Additionally, at 504, it is determined that the MTS object has been marked as inactive for a time period that exceeds a predetermined threshold. In one implementation, in response to determining that an MTS object is inactive, timestamp metadata indicating a time at which the MTS object was marked as inactive may be determined. In another implementation, this timestamp metadata may be compared to a current time to determine a time period for which the MTS object has been marked as inactive. In yet another implementation, this time period may be compared to a predetermined time threshold (such as thirty days, etc.).

Further, at 506, the MTS object is migrated from the in-memory MTS object table to an on-disk MTS object table. In one implementation, in response to determining that the calculated time period (for which the MTS object has been marked as inactive) exceeds the predetermined time threshold, the MTS object may be removed from the in-memory MTS object table and may be placed in an on-disk MTS object table. In another implementation, an on-disk MTS object table may include a table storing one or more MTS objects that is located within on-disk memory (such as one or more hard disk drives (HDDs), flash memory, etc.) of the system. In another implementation, migration of MTS objects may be performed in response to determining that the in-memory MTS object table is full (or is within a predetermined percentage of being full or has a predetermined number of MTS objects that exceeds a predetermined threshold).

Further still, in one implementation, an orgstore object may be created within the on-disk memory of the system and an MTS object table may be stored within the orgstore object. For example, the MTS object table may include metadata (such as an identifier) indicating a date and/or time range for all MTS objects within the MTS object table in on-disk memory. For instance, the range may include a minimum date/time and a maximum date/time of all MTS objects stored within the MTS object table. In another example, the MTS object may be stored within the MTS object table.

Also, at 508, compaction is performed on the in-memory MTS object table. In one implementation, removing the MTS object from the in-memory MTS object table may create one or more empty entries within the in-memory MTS object table. In another implementation, entries (e.g., MTS objects) within the in-memory MTS object table may be rearranged while the orgstore object is offline. In yet another implementation, empty entries may be removed within the in-memory MTS object table, and all entries within the in-memory MTS object table may be ordered according to one or more criteria (such as date, etc.).

FIG. 6 illustrates an example method 600 for conditionally migrating active metric time series data objects from an on-disk table to an in-memory table, according to at least one implementation. The method 600 may be performed by one or more components of FIGS. 1, 2, 3, and 9. A computer-readable storage medium comprising computer-readable instructions that, upon execution by one or more processors of a computing device, cause the computing device to perform the method 600. The method 600 may be performed in any suitable order. It should be appreciated that the method 600 may include a greater number or a lesser number of steps than that depicted in FIG. 6.

The method 600 may begin at 602, where MTS data is received for an MTS object that is marked as inactive within a first MTS object table. In one implementation, after a period of inactivity in which no MTS data is generated/collected/stored in association with an MTS object, the MTS object may be labeled as inactive. In another implementation, after the MTS object has been labeled as inactive, MTS data may again be generated, collected, and stored.

Additionally, at 604, the MTS object is moved from the first MTS object table to an in-memory MTS object table in response to the receiving. In one implementation, if the MTS object is currently in an in-memory MTS object table, the MTS object may be maintained within the in-memory MTS object table.

Further, at 606, the MTS object is marked as active within the in-memory MTS object table. In one implementation, the MTS object may be marked as active (e.g., by adjusting a flag within the MTS object indicating activity/inactivity) to indicate that MTS data associated with the MTS object is currently being received by the system. For example, the flag may be changed from a value indicating inactive to a value indicating active. In another implementation, additional metadata (such as a timestamp) may be added to the MTS object and may be reset, set to a default value (such as zero), etc.

FIG. 7 illustrates an example method 700 for implementing a query for metric time series objects within tiered metric time series object storage, according to at least one implementation. The method 700 may be performed by one or more components of FIGS. 1, 2, 3, and 9. A computer-readable storage medium comprising computer-readable instructions that, upon execution by one or more processors of a computing device, cause the computing device to perform the method 700. The method 700 may be performed in any suitable order. It should be appreciated that the method 700 may include a greater number or a lesser number of steps than that depicted in FIG. 7.

The method 700 may begin at 702, where a query for metric time series (MTS) objects stored within a system is received, the query including an indication of one or more characteristics of the MTS objects. In one implementation, the query may include a string that identifies one or more components of an MTS object, one or more dimensions, etc. In another implementation, the query may identify one or more key/value pair values. For example, the query may indicate a desired value for a metric, a desired value for a host name, a desired value for an orgID, a desired value for a region, etc.

Additionally, in one implementation, the query may indicate one or more timestamp values. For example, the timestamps may include a timestamp indicating when an MTS object was created, when an MTS object was last active, etc. In another implementation, the query string may be compiled into an abstract syntax string that contains one or more Boolean predicates. In yet another implementation, the query may be received at a system (such as the observability system 106 of FIG. 1). In still another implementation, the query may be received from one or more users, one or more applications, etc.

Further, at 704, one or more in-memory tables of the system are searched to determine a first group of matches to the query. In one implementation, the one or more in-memory tables store a first group of MTS objects marked as active within the system. In another implementation, the one or more in-memory tables may also store a second group of MTS objects marked as inactive for less than a threshold time amount within the system. In yet another implementation, the one or more in-memory tables may also store metadata associated with the MTS objects stored within the in-memory tables.

Further still, in one implementation, the values of the query may be compared to the data stored within the one or more in-memory tables. In another implementation, an MTS object within the one or more in-memory tables may be added to the first group of matches in response to determining that the MTS object has characteristics (such as metadata) matching the query.

Also, at 706, one or more on-disk tables of the system are searched to determine a second group of matches to the query. In one implementation, the one or more on-disk tables may store a group of MTS objects marked as inactive within the system, where the inactive MTS objects have been migrated from the one or more in-memory tables to the one or more on-disk tables. In another implementation, the one or more on-disk tables may also store metadata associated with the MTS objects stored within the on-disk tables. In yet another implementation, the values of the query may be compared to the data stored within the one or more on-disk tables. In still another implementation, an MTS object within the one or more on-disk tables may be added to the second group of matches in response to determining that the MTS object has characteristics matching the query.

In addition, at 708, the first group of matches and the second group of matches are combined to create a combined group of matches to the query. In one implementation, the first group of matches may be appended to the second number of matches. In another implementation, the first number of matches and the second number of matches may be merged. In yet another implementation, the matches may be ordered according to one or more criteria (e.g., creation date, source, etc.).

Furthermore, at 710, the combined group of matches to the query is returned. In one implementation, a visualization (such as a chart, a dashboard, a user interface (UI) element, etc.) may be generated based on the combined group of matches. In another implementation, the combined group of matches may be presented to one of more users via an interface (e.g., a user interface (UI)).

In one implementation, the query for MTS objects may include an indication of one or more locations to search for MTS objects that match the query. For example, the query may indicate that only MTS objects stored in in-memory tables may be searched, or that only MTS objects stored in on-disk tables may be searched. Searches may then be performed only within the locations indicated within the query. In one implementation, the query for MTS objects may include a time specification. It may then be determined, based on this time specification, whether the search is to be performed completely on the in-memory tables or whether the search is to be performed within the in-memory tables and some or all of the on-disk tables. For example, the search may be performed within the in-memory tables as well as one or more of the on-disk tables in response to determining that the one or more on-disk tables include a last active timestamp range that falls within the time specification. The search may be performed only within the in-memory tables (and not the on-disk tables) in response to determining no on-disk tables include a last active timestamp range that falls within the time specification.

FIG. 8 illustrates an example method 800 for implementing a query for metric time series objects within tiered metric time series object storage, according to at least one implementation. The method 800 may be performed by one or more components of FIGS. 1, 2, 3, and 9. A computer-readable storage medium comprising computer-readable instructions that, upon execution by one or more processors of a computing device, cause the computing device to perform the method 800. The method 800 may be performed in any suitable order. It should be appreciated that the method 800 may include a greater number or a lesser number of steps than that depicted in FIG. 8.

The method 800 may begin at 802, where a query for metric time series (MTS) objects stored within a system is received, the query including an indication of one or more characteristics of the MTS objects and a result threshold indicating a maximum number of matching MTS objects to be returned in response to the query. In one implementation, the query may include a string that identifies one or more components of an MTS object, one or more dimensions, etc. In another implementation, the query may identify one or more key/value pair values. For example, the query may indicate a desired value for a metric, a desired value for a host name, a desired value for an orgID, a desired value for a region, etc.

Additionally, in one implementation, the query may indicate one or more timestamp values. For example, the timestamps may include a timestamp indicating when an MTS object was created, when an MTS object was last active, etc. In another implementation, the query string may be compiled into an abstract syntax string that contains one or more Boolean predicates. In yet another implementation, the query may be received at a system (such as the observability system 106 of FIG. 1).

Further, in one implementation, the query may be received from one or more users, one or more applications, etc. In another implementation, the result threshold may include an integer value.

Further still, at 804, one or more in-memory tables of the system are searched to determine a first group of matches to the query. In one implementation, the one or more in-memory tables store a first group of MTS objects marked as active within the system. In another implementation, the one or more in-memory tables may also store a second group of MTS objects marked as inactive for less than a threshold time amount within the system. In yet another implementation, the one or more in-memory tables may also store metadata associated with the MTS objects stored within the in-memory tables.

Also, in one implementation, the values of the query may be compared to the data stored within the one or more in-memory tables. In another implementation, an MTS object within the one or more in-memory tables may be added to the first group of matches in response to determining that the MTS object has characteristics matching the query.

In addition, at 806, it is determined whether a number of matches within the first group of matches is equal to or greater than the result threshold. For example, an integer indicating a number of matches may be determined for the first group of matches, and this integer may be compared to an integer representing the result threshold.

Furthermore, in response to determining at 806 that the number of matches within the first group of matches is equal to or greater than the result threshold, at 808 the first group of matches is returned as results of the query. In one implementation, the first group of matches may be returned as the results of the query. In another implementation, a visualization (such as a chart, a dashboard, a user interface (UI) element, etc.) may be generated based on the first group of matches. In yet another implementation, the first group of matches may be presented to one of more users via an interface (e.g., a user interface (UI)).

Further still, in response to determining at 806 that the number of matches within the first group of matches is less than the result threshold, at 810 one or more on-disk tables of the system are searched to determine a second group of matches to the query. In one implementation, the one or more on-disk tables may store a second group of MTS objects marked as inactive within the system. In another implementation, within the one or more on-disk tables, the search may proceed in time-based order from a most recent on-disk table to a least recent on-disk table of the system to determine the second number of matches to the query.

For example, multiple on-disk tables may be stored on-disk, where each of the multiple on-disk tables includes a timestamp range indicating values of timestamps of MTS objects stored within the on-disk table. For example, all MTS objects stored within an on-disk table may have timestamps (such as "last active" timestamps indicating the time at which the MTS object was last accessed) that fall within the timestamp range of the on-disk table. In another example, the search may start at the most recent on-disk table (e.g., an on-disk table with an associated date and time value closest to a current date and time). In yet another example, results from querying the most recent on-disk table may be added to a second group of matches.

Also, in one example, the number of matches within the second group of matches may be added to the number of matches within the first group of matches to create a total number of matches. In another example, if the total number of matches is less than the result threshold, the search may proceed at the next most recent on-disk table (e.g., an on-disk table with an associated date and time value second closest to the current date and time). In yet another example, results from querying the next most recent on-disk table may be added to the second group of matches.

Additionally, in one example, the updated number of matches within the second group of matches may be added to the number of matches within the first group of matches to create a total number of matches. In another example, if the total number of matches is less than the result threshold, the search may proceed at the next most recent on-disk table (e.g., an on-disk table with an associated date and time value third closest to the current queried date and time). In yet another example, this process may proceed until all of the on-disk tables have been queried, or the total number of matches reaches the result threshold.

Further, at 812, the first group of matches and the second group of matches are combined to create a combined group of matches to the query. For example, the first group of matches may be appended to the second number of matches. In another example, the first number of matches and the second number of matches may be merged. In yet another example, the matches may be ordered according to one or more criteria (e.g., creation date, source, etc.).

Further still, at 814, the combined group of matches to the query are returned. In one implementation, a chart/dashboard/UI element may be generated based on the combined group of matches.

In this way, a search for MTS objects may be performed within the system, where the search prioritizes in-memory tables over on-disk tables. This may improve a performance of the search by prioritizing faster storage media over slower storage media, which may improve a performance of computer hardware performing such a search. This may also improve results of such a search by prioritizing active MTS objects over inactive MTS objects when performing the search.

Tiered Metric Time Series (MTS) Object Storage

MTS object query patterns reveal that users are looking for recent data most of the time. For example:
  99.5% of queries search within 30 days of data on average.
  92% of queries search within 7 days of data on average.
  71% of queries search within 1 day of data on average.

By moving infrequently queried MTS object data from memory to disk at the expense of higher query latencies for a very small number of queries (e.g., less than 0.5% queries on average), storage costs may be reduced, while optimizing query search performance. Additionally, in-memory storage capacity addition is time consuming and may be reduced through this implementation.

Moving data from memory to disk may happen when compaction is triggered, where the container is not serving any queries. This task may happen while MTS object storage is serving queries as well. Logic to move data from memory to disk may include logic to copy inactive MTS data from beginning MTSTable segments in the in-memory OrgStore and appending to the end of the MTSTable in OrgStore on disk. Then, a tombstone may be created for the entry in memory which will be cleaned up during compaction.

To clear tombstones, MTS object tables may be written into new locations. During data load, files related to OrgStore on disk may be mapped to appropriate table segments so that data can be accessed on-demand. Files from backups may persist after backup deletion. For example, hard links may be used to create a link from the backups folder to a workspace folder during data load and vice-versa when taking backups.

Thresholds for when to run compaction (e.g., a predetermined number of tombstones, a predetermined percentage of tombstones to non-migrated data, etc.) can be different for in-memory and on-disk OrgStore objects. Compaction may be optimized by putting data from a previous month in a separate OrgStore so that only that OrgStore has a large percentage of tombstones.

Figure 9:
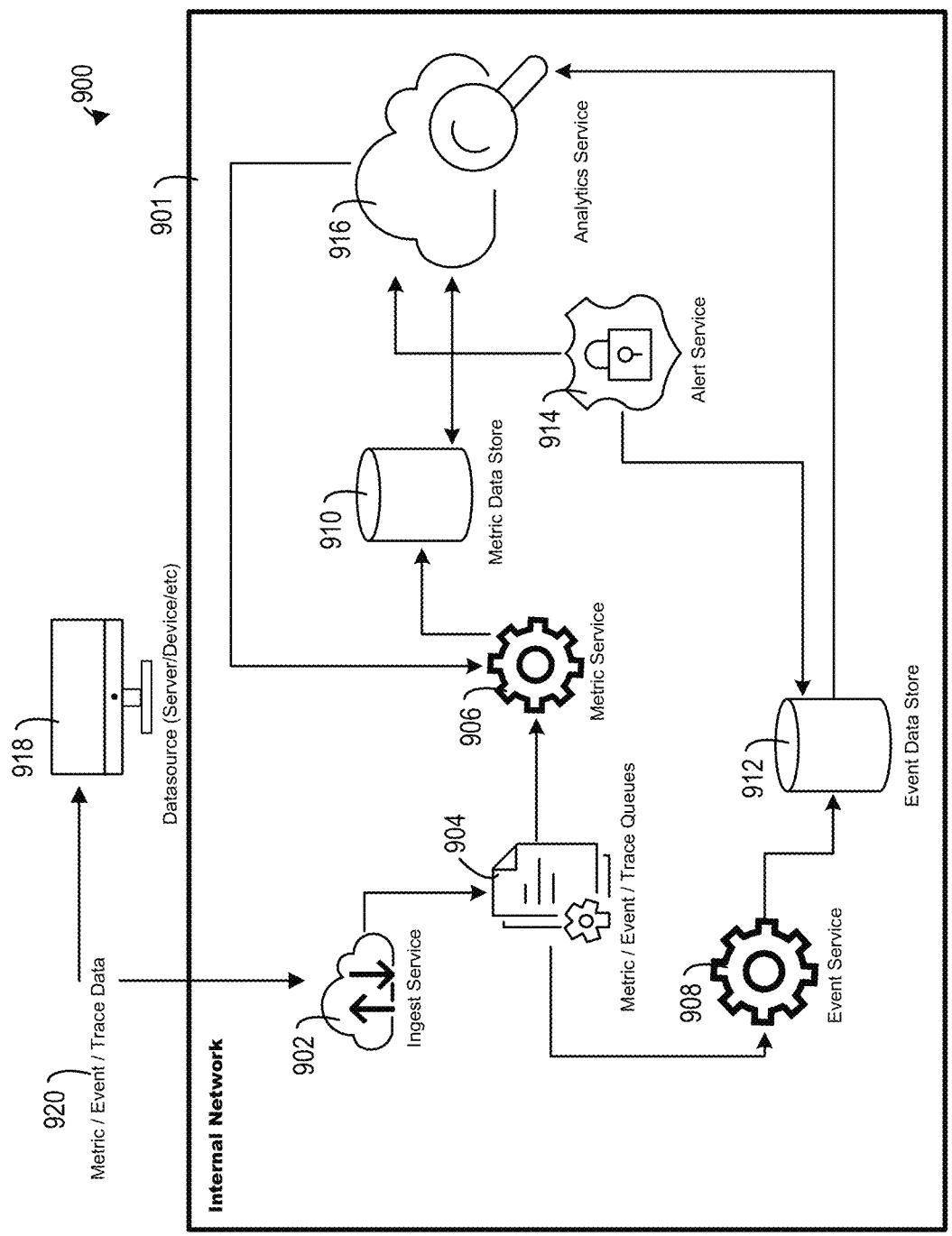
FIG. 9 is a block diagram of an observability environment, according to at least one implementation.

FIG. 9 is a block diagram of an implementation of an observability environment 900. In the illustrated implementation, the observability environment 900 includes an observability system 901 with an ingest service 902, a metric/event/trace data queue 904, a metric service 906, an event service 908, a metric data store 910 and an event data store 912, an alert service 914, and an analytics service 916.

The ingest service 902, the metric/event/trace data queue 904, the metric service 906, the event service 908, the metric data store 910 and the event data store 912, the alert service 914, and the analytics service 916 can communicate with each other via one or more internal networks (e.g., networks internal to the observability system 901), such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 9, it will be understood that a data source 918 can communicate with the observability system 901 via one or more networks.

In some implementations, metric/event/trace data 920 may be received from a data source 918 via the ingest service 902. For example, one or more monitoring agents may be deployed within the data source 918, where such monitoring agents identify, retrieve, and/or compile the metric/event/trace data 920. In another example, the metric/event/trace data 920 may be sent from the data source 918 (e.g., by one or more monitoring agents within the data source 918) to the ingest service 902, utilizing an application programming interface (API) installed within the observability system 901.

Additionally, after being received by the ingest service 902, the metric/event/trace data 920 may be stored in a metric/event/trace data queue 904. The metric/event/trace data queue 904 may include one or more hardware storage components used to store the metric/event/trace data 920. The metric/event/trace data queue 904 may implement one or more predetermined storage methods (such as a first in, first out (FIFO) storage method, etc.).

Further, the metric/event/trace data 920 may be sent from the metric/event/trace data queue 904 to the metric service 906 for processing. In some implementations, the metric service 906 may create one or more time series metrics, utilizing the metric/event/trace data 920. These time series metrics may be stored in the metric data store 910. Further still, the metric/event/trace data 920 may be sent from the metric/event/trace data queue 904 to the event service 908 for processing. In some implementations, the event service 908 may create one or more events, utilizing the metric/event/trace data 920. These events may be stored in the event data store 912.

Also, the analytics service 916 may retrieve time series metrics from the metric data store 910, and may retrieve events from the event data store 912. In some implementations, the time series metrics and the events may be retrieved by the analytics service 916 utilizing one or more mathematical functions, one or more filtering functions, etc.

These time series metrics and events may be processed by the analytics service 916 to produce result data. This result data may be stored, used to create visualization data for display, etc.

In addition, the alert service 914 may retrieve the result data from the analytics service 916. The alert service may compare this result data against one or more alerting rules to determine one or more matches. If match criteria are determined (e.g., one or more matches with the result data are determined, the result data exceeds one or more thresholds, etc.), the alert service 914 may create one or more events that are sent to one or more entities (e.g., users, etc.), stored in the event data store 912, etc.

In this way, the observability system 901 may retrieve, sort, and analyze input metric/event/trace data 920. Results of the analysis may include alerts that are presented to one or more users as well as visualization data that may be presented via one or more displays.

Computer programs typically comprise one or more instructions set at various times in various memory devices of a computing device, which, when read and executed by at least one processor, will cause a computing device to execute functions involving the disclosed techniques. In some implementations, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain implementations require at least one of X, at least one of Y and at least one of Z to each be present. Further, use of the phrase "at least one of X, Y or Z" as used in general is to convey that an item, term, etc. may be either X, Y or Z, or any combination thereof.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Implementations are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112 (f) (AIA), other aspects may likewise be embodied as a means-plus-function claim, or in other forms, such as being embodied in a computer-readable medium. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application, in either this application or in a continuing application.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   identifying, by a computer system, a query for metric time series (MTS) objects stored within the computer system, the query including an indication of one or more characteristics of the MTS objects and a result threshold indicating a maximum number of matching MTS objects to be returned in response to the query;
   searching, by the computer system, one or more in-memory tables of the computer system to determine a first group of matches to the query;
   comparing, by the computer system, a number of matches within the first group of matches to the result threshold;
   in response to determining that the number of matches within the first group of matches is equal to or greater than the result threshold, returning, by the computer system, the first group of matches as results of the query; and
   in response to determining that the number of matches within the first group of matches is less than the result threshold:
      searching, by the computer system, one or more on-disk tables of the computer system to determine a second group of matches to the query,
      combining, by the computer system, the first group of matches and the second group of matches to create a combined group of matches to the query, and
      returning, by the computer system, the combined group of matches as results of the query.

2. The computer-implemented method of claim 1, wherein the one or more in-memory tables store a first group of MTS objects for which corresponding MTS data has been received at the computer system within a predetermined time period.

3. The computer-implemented method of claim 1, wherein the one or more on-disk tables store a second group of MTS objects for which corresponding MTS data has not been received at the computer system within a predetermined time period.

4. The computer-implemented method of claim 1, wherein searching the one or more in-memory tables of the computer system includes comparing one or more values of the query to characteristics of MTS objects stored within the one or more in-memory tables, where an MTS object within the one or more in-memory tables is added to the first group of matches in response to determining that the MTS object has characteristics matching the query.

5. The computer-implemented method of claim 1, wherein searching the one or more on-disk tables of the computer system includes comparing one or more values of the query to characteristics of MTS objects stored within the one or more on-disk tables, where an MTS object within the one or more on-disk tables is added to the second group of matches in response to determining that the MTS object has characteristics matching the query.

6. The computer-implemented method of claim 1, wherein returning matches as results of the query includes generating and presenting a visualization, the visualization including one or more of a chart, a dashboard, and a user interface (UI) element.

7. The computer-implemented method of claim 1, wherein searching the one or more on-disk tables of the computer system is performed in a time-based order from a most recent on-disk table to a least recent on-disk table to determine the second group of matches to the query.

8. The computer-implemented method of claim 7, wherein searching the one or more on-disk tables of the computer system is performed until the result threshold is met or all of the one or more on-disk tables are searched.

9. The computer-implemented method of claim 1, wherein the query includes a string that identifies one or more components of an MTS object.

10. The computer-implemented method of claim 9, wherein the query string is compiled into an abstract syntax string that contains one or more Boolean predicates.

11. A system comprising:
    one or more processors configured to:
    identify a query for metric time series (MTS) objects stored within a system, the query including an indication of one or more characteristics of the MTS objects and a result threshold indicating a maximum number of matching MTS objects to be returned in response to the query;
    search one or more in-memory tables of the system to determine a first group of matches to the query;
    compare a number of matches within the first group of matches to the result threshold;
    in response to determining that the number of matches within the first group of matches is equal to or greater than the result threshold, return the first group of matches as results of the query; and
    in response to determining that the number of matches within the first group of matches is less than the result threshold:
    search one or more on-disk tables of the system to determine a second group of matches to the query,
    combine the first group of matches and the second group of matches to create a combined group of matches to the query, and
    return the combined group of matches as results of the query.

12. The system of claim 11, wherein the one or more in-memory tables store a first group of MTS objects for which corresponding MTS data has been received at the system within a predetermined time period.

13. The system of claim 11, wherein the one or more on-disk tables store a second group of MTS objects for which corresponding MTS data has not been received at the system within a predetermined time period.

14. The system of claim 11, wherein searching the one or more in-memory tables of the system includes comparing one or more values of the query to characteristics of MTS objects stored within the one or more in-memory tables, where an MTS object within the one or more in-memory tables is added to the first group of matches in response to determining that the MTS object has characteristics matching the query.

15. The system of claim 11, wherein searching the one or more on-disk tables of the system includes comparing one or more values of the query to characteristics of MTS objects stored within the one or more on-disk tables, where an MTS object within the one or more on-disk tables is added to the second group of matches in response to determining that the MTS object has characteristics matching the query.

16. The system of claim 11, wherein returning matches as results of the query includes generating and presenting a visualization, the visualization including one or more of a chart, a dashboard, and a user interface (UI) element.

17. The system of claim 11, wherein searching the one or more on-disk tables of the system is performed in a time-based order from a most recent on-disk table to a least recent on-disk table to determine the second group of matches to the query.

18. The system of claim 17, wherein searching the one or more on-disk tables of the system is performed until the result threshold is met or all of the one or more on-disk tables are searched.

19. The system of claim 11, wherein the query includes a string that identifies one or more components of an MTS object.

20. A non-transitory computer-readable medium storing a set of instructions, the set of instructions when executed by one or more processors cause processing to be performed comprising:
   identifying a query for metric time series (MTS) objects stored within a system, the query including an indication of one or more characteristics of the MTS objects and a result threshold indicating a maximum number of matching MTS objects to be returned in response to the query;
   searching one or more in-memory tables of the system to determine a first group of matches to the query;
   comparing a number of matches within the first group of matches to the result threshold;
   in response to determining that the number of matches within the first group of matches is equal to or greater than the result threshold, returning the first group of matches as results of the query; and
   in response to determining that the number of matches within the first group of matches is less than the result threshold:
      searching one or more on-disk tables of the system to determine a second group of matches to the query,
      combining the first group of matches and the second group of matches to create a combined group of matches to the query, and
   returning the combined group of matches as results of the query.

* * * * *